May 2, 1950  V. A. HARMAN  2,506,214
MERRY-GO-ROUND

Filed Aug. 22, 1946  2 Sheets-Sheet 1

*INVENTOR.*

VESPER A. HARMAN

BY *Victor J. Evans & Co.*

ATTORNEYS

May 2, 1950 V. A. HARMAN 2,506,214
MERRY-GO-ROUND
Filed Aug. 22, 1946 2 Sheets-Sheet 2

INVENTOR.
VESPER A. HARMAN
BY Victor J. Evans & Co.
ATTORNEYS

Patented May 2, 1950

2,506,214

UNITED STATES PATENT OFFICE 2,506,214

MERRY-GO-ROUND

Vesper A. Harman, Richland, Wash.

Application August 22, 1946, Serial No. 692,222

4 Claims. (Cl. 272—31)

This invention relates to amusement devices, and more particularly to improvements in power units for use in merry-go-rounds.

It is an object of the invention to provide a power unit especially adapted for use on small merry-go-rounds such as used in playgrounds, or schools or places of amusement.

A further object of the invention is the provision of power unit for a merry-go-round, in which a rope or cable is wound about a standard in opposition to the pull of springs, and the unwinding of the cable by the springs will cause the merry-go-round to rotate for a period in one direction, and then rotate for a period in an opposite direction.

A further object of the invention is the provision of a power unit of simple and durable structure, upon which unit a merry-go-round of any conventional type may be mounted for the operation thereof.

These and other objects are attained by the novel construction and arrangement of parts hereinafter described and illustrated by the accompanying drawings, forming a part hereof, and in which.

Figure 1:
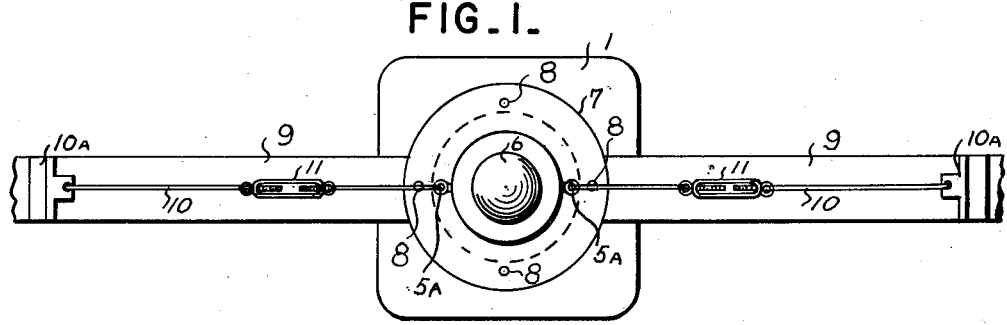
Figure 1 is a plan view of a power unit embodying the invention.
Figure 2:
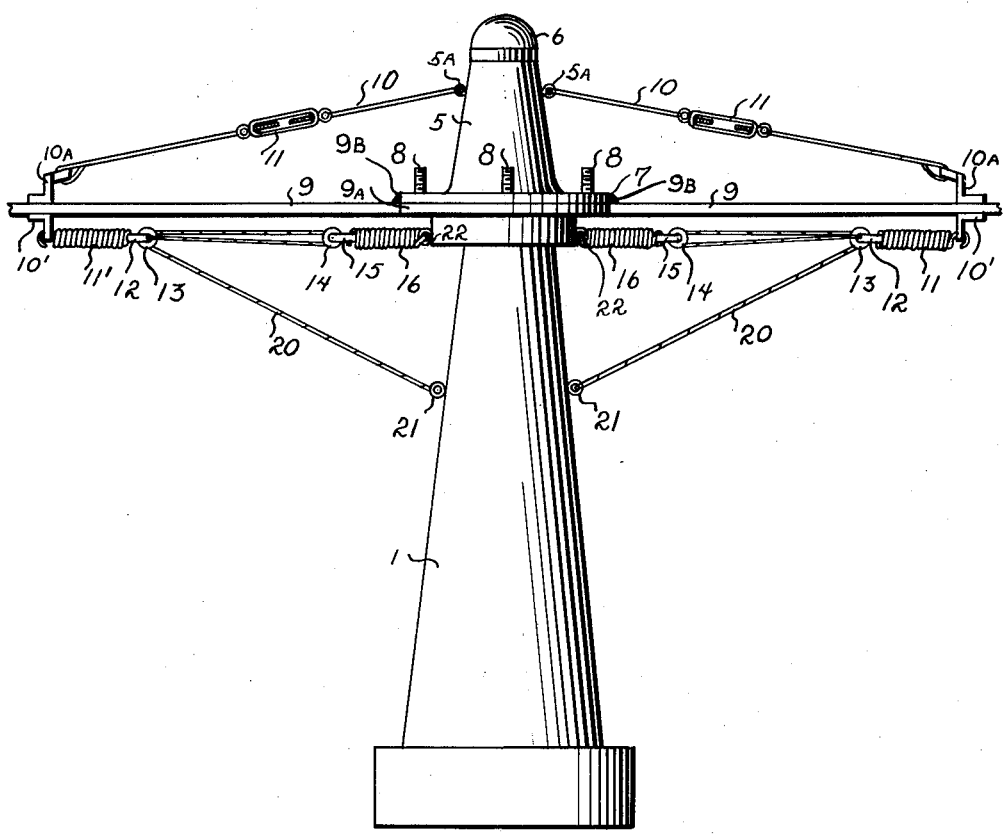
Figure 2 is a side elevational view of the unit.
Figure 3:
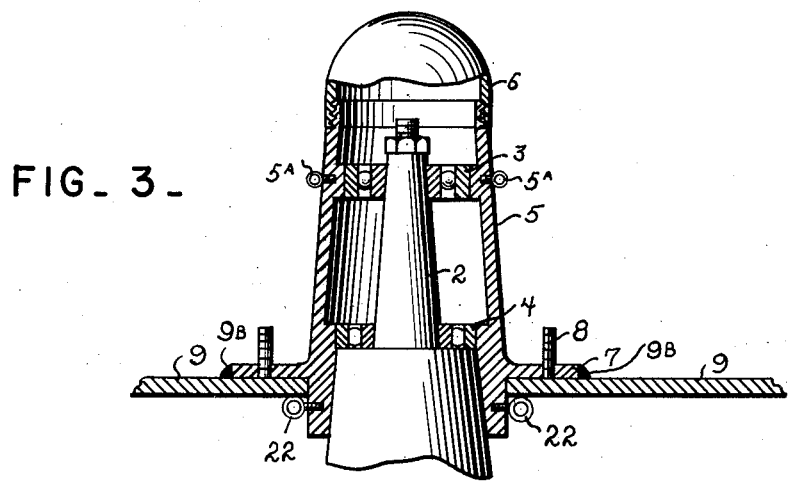
Figure 3 is a sectional view of the unit taken on line 3—3 of Figure 1.

Referring to the drawings, the power unit for merry-go-rounds is shown to include a standard 1, which is tapered, and having its upper end supporting a spindle 2 upon which is mounted an upper bearing 3 and a lower bearing 4. The bearings are of the ball or roller type to facilitate rotation of a hub 5, which is provided with a threadably mounted cap 6 to protect the bearings from dust.

The hub 5 is provided with a plurality of holes in a flange 7, in which are mounted the merry-go-round supporting bolts 8 by which a merry-go-round frame A is attached to the unit, and nuts on the bolts will retain the frame in fixed relation to the unit.

The radial arms 9 are provided with a central circular flange 9a which is welded at 9b to the lower periphery of the flange 7 and the outer ends of the arms are connected by cable trusses 10 to the hub 5 by means of the eyes 10a on the upperside of the arms and rings 5a on the hub, the cables 10 having turnbuckles 11 intermediate their lengths for adjustment purposes.

On the underside of the outer end of each of the arms 9 is an eye 10' to which is connected one end of a coil spring 11', which is connected to a yoke 12 supporting a pulley 13. A cable or rope 20 has one end thereof attached to the yoke 12, the cable going from the yoke 12 to a second cable receiving pulley 14, over which the cable passes, and then back to pulley 13 over which it passes down to a ring 21 on the standard 1, to which the other end of the cable is connected.

The pulley 14 is supported by a yoke 15, connected to a spring 16, which is connected by a ring 22 to the hub 5.

Figure 4:
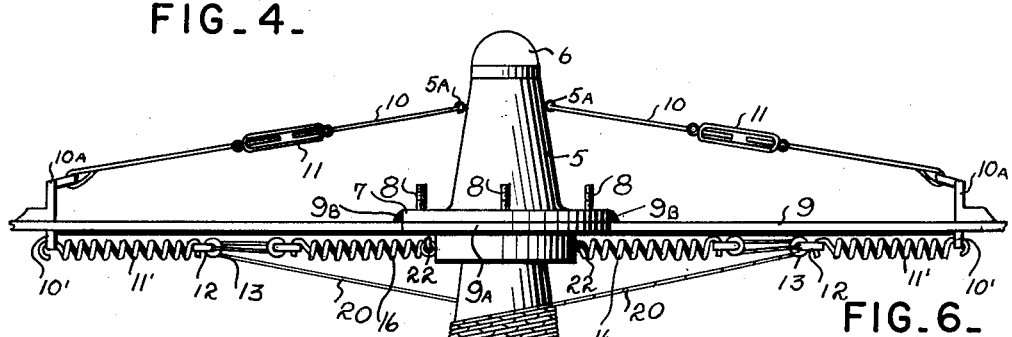
Figure 4 is a side elevational view similar to Figure 2, showing the position of parts when the unit has been wound for operating a merry-go-round.
Figures 5, 6:
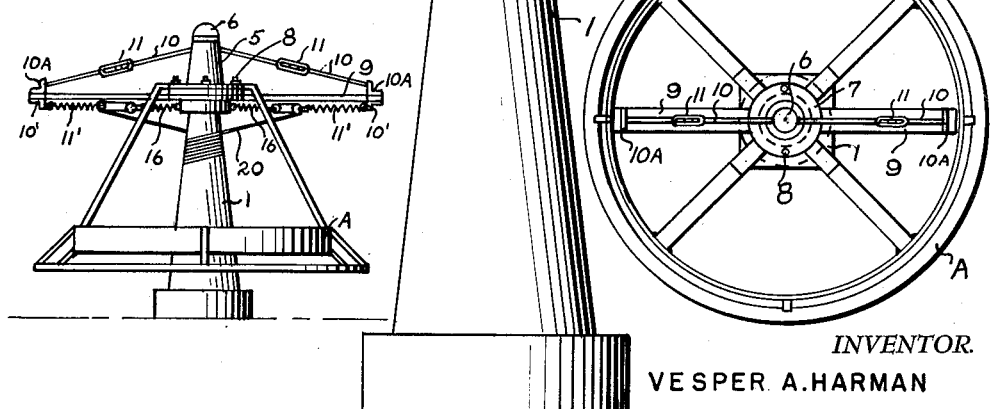
Figure 5 is an elevational view of a circular merry-go-round seat attached thereto and Figure 6 is a top plan view of Figure 5.

In operation, the arms 9 are manually rotated to wind the cables 20 about the standard 1 as shown in Figure 4. The springs are now extended, and when the arms are released, the springs will cause the cables to unwind. For example, if wound 10 revolutions before starting, when released, it will unwind 19 revolutions in one direction, then stop, and rotate 18 revolutions in the opposite direction, and so on back and forth until it stops.

The power unit can be made in various sizes, and rubber bands can be used instead of the springs, also various combinations of springs and pulleys can be used as may be desired, the basic principle being the same. Other types of merry-go-rounds may also be used with the unit than the type shown.

The above description is to be considered as illustrative and not limitative of the invention of which modifications can be made without department from the spirit and scope of the appended claims.

The invention having been described, what is claimed is:

1. In a power unit for a merry-go-round, a stationary standard, a spindle mounted on the standard, a hub rotatably mounted on the spindle, radial arms attached to the hub, a first spring attached to the end of each of said arms, a cable having one end thereof connected to the spring, a second spring secured to said hub, a pulley supported by the second spring, and a pulley supported by the first spring, said cable passing over both of said pulleys and having its other end attached to the standard said cable being adapted to be wound up on said stationary standard when said springs are extended.

2. In a power unit, a stationary standard, a hub rotatably mounted on the standard, a pair of radial arms attached to the hub, each arm having a spring connected to the free end thereof, a cable connected to said spring, a second spring connected to the hub, cable receiving pulleys supported by said springs, said cable passing over both of the pulleys and having its other end attached to the standard said cable being adapted to be wound up on said stationary standard when said springs are extended, and means to attach a merry-go-round frame to the hub.

3. In a power unit, a stationary standard, a hub rotatably mounted on the standard, a circular flange on the hub, a pair of radial arms having a central circular flange attached to flange on the hub, trusses including turnbuckles connected to the ends of the arms and to the hub, each arm having a spring connected to the underside thereof, a cable having one end attached to the spring, a spring connected to the hub, and pulleys supported by said springs, said cable passing over the pulleys and having its other end attached to the standard said cable being adapted to be wound up on said stationary standard when said springs are extended.

4. The structure set forth in claim 3 further characterized by a flange on the hub having means thereon for attaching a merry-go-round frame to the power unit.

VESPER A. HARMAN.

REFERENCES CITED

The following references are of record in the file of this patent:

UNITED STATES PATENTS

| Number | Name | Date |
|---|---|---|
| 651,021 | Silvey | June 5, 1900 |
| 725,107 | Lund | Apr. 14, 1903 |
| 1,157,166 | Lukstat | Oct. 19, 1915 |
| 1,855,535 | Wolff | Apr. 26, 1932 |
| 1,873,916 | Allabough | Aug. 23, 1932 |